(12) United States Patent
Buehler et al.

(10) Patent No.: US 8,563,653 B2
(45) Date of Patent: Oct. 22, 2013

(54) POLYAMIDE MOULDING COMPOUND FOR VARNISH-FREE, TOUGH CASINGS WITH A HIGH-GLOSS SURFACE

(75) Inventors: Friedrich Severin Buehler, Thusis (CH); Etienne Aepli, Domat/Ems (CH); Sepp Bass, Domat/Ems (CH); Ralf Hala, Lindenberg (DE)

(73) Assignee: EMS-Patent AG, Domat/Ems (CH)

( * ) Notice: Subject to any disclaimer, the term of this patent is extended or adjusted under 35 U.S.C. 154(b) by 463 days.

(21) Appl. No.: 12/385,087

(22) Filed: Mar. 30, 2009

(65) Prior Publication Data

US 2009/0247699 A1    Oct. 1, 2009

(30) Foreign Application Priority Data

Mar. 31, 2008  (DE) .................. 10 2008 016 436

(51) Int. Cl.
C08L 51/04  (2006.01)
C08L 77/00  (2006.01)
C08L 77/02  (2006.01)
C08L 77/06  (2006.01)

(52) U.S. Cl.
USPC .......................................... 525/66; 525/432

(58) Field of Classification Search
USPC .................................... 525/66, 432
See application file for complete search history.

(56) References Cited

U.S. PATENT DOCUMENTS

| | | | |
|---|---|---|---|
| 4,873,289 A | 10/1989 | Lindner et al. | |
| 5,286,792 A * | 2/1994 | Wu et al. | 525/84 |
| 5,332,782 A * | 7/1994 | Liu et al. | 525/66 |
| 5,863,974 A * | 1/1999 | Tjahjadi et al. | 524/412 |
| 5,917,001 A * | 6/1999 | Laederach et al. | 528/322 |
| 5,990,244 A * | 11/1999 | Warakomski et al. | 525/179 |
| 6,831,137 B2 * | 12/2004 | Torre et al. | 525/432 |
| 6,869,497 B2 | 3/2005 | Doe et al. | |
| 2002/0103294 A1 * | 8/2002 | Chisholm et al. | 525/65 |
| 2002/0143107 A1 * | 10/2002 | Chau | 525/191 |
| 2006/0293438 A1 | 12/2006 | De Souza | |
| 2007/0249789 A1 | 10/2007 | Buehler et al. | |
| 2008/0021143 A1 | 1/2008 | Thullen et al. | |
| 2008/0167415 A1 * | 7/2008 | Stoeppelmann et al. | 524/494 |
| 2009/0131569 A1 | 5/2009 | Schwitter et al. | |
| 2009/0171038 A1 * | 7/2009 | Steffner | 525/435 |

FOREIGN PATENT DOCUMENTS

| | | |
|---|---|---|
| DE | 19821719 | 11/1999 |
| DE | 102005023420 | 11/2006 |
| EP | 0208187 | 11/1990 |
| EP | 0654505 | 5/1995 |
| EP | 1227131 | 3/2006 |
| EP | 1847569 | 10/2007 |
| EP | 1882719 | 1/2008 |
| WO | WO 2007/076108 | 7/2007 |
| WO | WO 2007074086 | * 7/2007 |

* cited by examiner

Primary Examiner — Jeffrey Mullis
(74) Attorney, Agent, or Firm — Jacobson Holman PLLC

(57) ABSTRACT

Polyamide moulding compounds for the production of unvarnished moulded articles with a high-gloss surface and outstandin toughness are provided. By means of moulded articles which are produced with very high surface quality from the moulding compounds, the complex, cost-intensive and frequently environmentally impacting varnishing processes can be avoided.

23 Claims, No Drawings

POLYAMIDE MOULDING COMPOUND FOR VARNISH-FREE, TOUGH CASINGS WITH A HIGH-GLOSS SURFACE

FIELD OF THE INVENTION

The invention relates to polyamide moulding compounds for the production of unvarnished moulded articles with a high-gloss surface and outstanding toughness. By means of moulded articles which are produced with very high surface quality from the moulding compounds according to the invention, the complex, cost-intensive and frequently environmentally impacting varnishing processes can be avoided.

Objects in daily use, such as for example mobile telephones, MP3 players, sunglasses, cameras, binoculars, GPS devices, and many others are produced with high-gloss surfaces which emphasise the value of the product and make differentiation from low-price products possible.

BACKGROUND OF THE INVENTION

High-quality surfaces are used as an aid in "high end quality" positioning of car equipment, household appliances, entertainment electronics, sports equipment and industrial surfaces which are easy to clean.

Cleanable surfaces must have in addition suitable scratch resistance and high chemical resistance in order that they retain the appearance of new devices for as long as possible.

These devices are intended at the same time to have high reliability with respect to being dropped, impact and shock and therefore have tough, protective casings. Hence a material which displays a difficult property combination of high-gloss surface, toughness and scratch resistance is required for the moulded article.

Numerous patents describe the impact strength modification of polyamides with different elastomeric modifiers. The impact strength in partially crystalline polyamides can hence be improved.

The impact strength modification of amorphous products is rarely required since the modifiers greatly influence the surfaces. Roughness, gloss and homogeneity are greatly impaired so that moulded articles which are visually apparent in an application are no longer accepted or require to be varnished.

Amorphous polyamides without impact modifiers have a good surface but do not achieve notch impact strength values of above 15 kJ/m$^2$. The same applies for blends of amorphous and partially crystalline polyamides in which the surface quality is likewise good but the impact strength does not suffice.

EP 1 847 569 A1 describes for example transparent polyamides which are blended with polyester amides and have increased notch impact strength. No gloss values are indicated and in particular the comparative examples with the impact modifiers reveal severe clouding (haze).

EP 1 227 131 B1 describes a transparent polyamide composition. In the moulding compound according to this publication, a partially crystalline polyamide forms the basis for a blend, the notch impact strength of which can be improved by means of impact modifiers. The effect on the gloss is however inadequate.

Also moulding compounds containing polyphenylene ethers, described for example in EP 0 654 505 B1, having polyamides which can if necessary be modified with respect to impact strength are known for having inadequate properties with respect to the gloss values.

Further polyamide moulding compounds are described in DE 10 2005 023 420 A1, DE 198 21 719 A1 and EP 1 882 719 A1.

SUMMARY OF THE INVENTION

Starting from the disadvantages mentioned in the state of the art, it is the object of the present invention to provide a polyamide moulding compound, and also moulded articles formed herefrom, which has excellent gloss values and high notch impact strength at the same time.

According to the invention, a polyamide moulding compound is provided, containing a) 95 to 51% by weight of an amorphous copolyamide of the formula

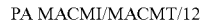

with a MACMI proportion in the copolyamide in the range of 5 to 95% by weight, MACMT proportion in the range of 0 to 90% by weight and LC12 proportion in the range of 5 to 60% by weight, the sum of these three proportions in copolyamide a) being 100% by weight, b) 5 to 49% by weight of an amorphous or microcrystalline or partially crystalline polyamide of the formula

the proportions x, y, u and z of the four monomer groups being respectively between 0 and 100% by weight, the sum of these four proportions in polyamide b) being 100% by weight; X, Y and U meaning dicarboxylic acids, selected from the group comprising DC4, DC6, DC9, DC10, DC11, DC12, DC13, DC14, DC15 to DC36, and LCZ lactams or corresponding amino carboxylic acids selected from the group comprising LC4, LC6, LC11 and LC12, c) 1 to 30% by weight at least of one impact modifier, and also d) 0 to 80% by weight at least of one additive, the sum of components a), b), c) and d) being 100% by weight.

The notations and abbreviations which are used correspond to the internationally customary polyamide nomenclature according to ISO 1874-1 (1992). In addition, the abbreviation DC means dicarboxylic acid (with the number of C-atoms) and LC lactam (with the number of C-atoms). In the PA description itself, only the number for the number of C-atoms of the corresponding DC- or LC-monomer is however described in the concrete case.

The moulding compounds according to the invention fulfil the object and are distinguished moreover by low distortion of moulded articles produced therefrom and also by further properties such as outstanding scratch resistance, a high glass-transition temperature Tg and high chemical resistance.

Particularly low-distortion moulded articles can be produced from moulding compounds with an excess of the amorphous copolyamide a) relative to polyamide b). Such preferred polyamide moulding compounds contain a proportion of the amorphous copolyamide a) of 85 to 51% by weight, preferably of 80 to 51% by weight and a proportion of polyamide b) of 10 to 49% by weight, preferably of 15 to 49% by weight.

The toughness of the moulding compounds according to the invention is increased with impact modifiers c) which are preferably of the core-shell type. A core-shell impact modifier is preferred, based on methacrylates, butadiene and styrene (MBS copolymer). An impact modifier of this type can be obtained for example under the trade name Paraloid BTA 753 from the company Rohm and Haas.

Polyamide b) assumes an important role. It is the knowledge of the inventors that addition thereof to a mixture of polyamide a) and impact modifier c) increases both the gloss and the impact strength. This allows the inventive scope for fulfilling both requirements at the same time, even if impact modifier types are used which impair the gloss more significantly than the core-shell types but are more effective in the function of the impact modification.

Even with normal impact modifiers, such as Tafiner (an acid-modified ethylene-α-olefin copolymer) and Lotader (an ethylene-glycidylmethacrylic acid polymer) which greatly reduce the gloss, the invention therefore achieves at the same time sufficiently high values in the gloss and in the impact strength if the quantity of additive is reduced in the case of the normal impact modifiers with a greater effect, e.g. to 2 to 5% by weight. This can be understood with reference to the comparative examples and examples (cf. Table 1). In the examples which use Tafiner and Lotader it is striking that these are very effective in the function as impact modifiers and, when a quantity of additive of 10% by weight, notch impact strengths of approx. 35 to 40 kJ/m$^2$ are achieved. The quantity of additive thereof can therefore be reduced without difficulty to half or less, as a result of which impact strengths of approx. 15 kJ/m$^2$ or more are still achieved. On the other hand, it emerges from the comparative example 1 that without impact modifier the required gloss value is greatly exceeded (93%), which is however accompanied by inadequate impact strength. From these two pieces of knowledge, it can be interpolated almost linearly that the quantity of additive of normal impact modifiers can be measured out in a lesser quantity so that the impact strength in fact assumes sufficiently high values but at the same time the gloss value does not fall below 50%.

Preferably, there are possible as usable impact modifiers those selected from the group of ethylene-α-olefin copolymers, ethylene-glycidylmethacrylic acid polymers and/or core-shell impact modifiers, the latter being particularly preferred. These impact modifiers are distinguished in that only minimal impairment of the surface gloss is effected, as a result of which tough and at the same time high-gloss moulding compounds are accessible with excellent values respectively in this context.

An impact modifier which is particularly preferred is, as mentioned already, a methacrylate-butadiene-styrene (MBS) core-shell impact modifier. Impact modifiers of this type are mentioned for example in EP 1 847 569 A1 or in WO 2007/076108 A1 or in US 2006/0293438 A1. Further publications which indicate the structure and also the chemical structure of the core-shell impact modifiers to be preferred are e.g. U.S. Pat. No. 6,869,497 B2, EP 0 208 187 B1 or EP 0 654 505 B1. It must thereby be stressed that objects other than those mentioned above underlie each of these publications and the solution according to the invention can be derived from none of the publications.

For high-quality surfaces, a gloss value of at least 50% is required, measured at an angle of 20°. These values are achieved by the moulding compound according to the invention.

In a preferred embodiment it is provided that, in the case of copolyamide a), the proportion of the quantity of lactam is between 10 to 50% by weight, preferably between 15 and 45% by weight.

Furthermore, the possibility is presented that, in the case of copolyamide a), MACM is replaced entirely or partially by diamines, selected from the group comprising PACM, HMD, MXD, NBD, IPD and/or BAC.

MACM stands for the ISO description bis-(4-amino-3-methylcyclohexyl)-methane which is also termed 3,3'-dimethyl-4,4'-diaminodicyclohexylmethane and is commercially available as trade product Laromin C260 type (CAS no. 6864-37-5), preferably with a melting point between −10° C. and 0° C.

PACM stands for the ISO description bis-(4-aminocyclohexyl)-methane which is also termed 4-4' diaminocyclohexylmethane and commercially available in the trade as Dicycane type (CAS no. 1761-71-3), preferably with a melting point between 30° C. and 45° C.

HMD is the abbreviation for hexamethylenediamine. MXD stands for meta-xylylenediamine. NBD is the abbreviation for norbornanediamine. IPD means isophoronediamine and BAC stands for bisaminocyclohexane.

Most of these abbreviations for monomers are listed in addition in the already presently cited standard ISO 1874-1 (1992) on the last page.

In a further advantageous embodiment, copolyamide a) is a PA MACMI/12 and has a MACMI proportion in the copolyamide in the range of 60 to 70% by weight and an LC12 proportion in the range of 30 to 40% by weight.

As an alternative hereto, it is possible in a further preferred embodiment that copolyamide a) is a PA MACMI/12 and has a MACMI proportion in the copolyamide in the range of 75 to 85% by weight and an LC12 proportion in the range of 15 to 25% by weight.

As a further preferred alternative it is likewise possible that copolyamide a) has
a MACMI proportion in the copolyamide in the range of 30 to 45% by weight,
a MACMT proportion in the range of 30 to 45% by weight and
an LC 12 proportion in the range of 40 to 10% by weight,
these three proportions in the copolyamide together being 100% by weight.

I thereby stands for isophthalic acid, T for terephthalic acid and LC12 for Lactam 12 (=laurinlactam).

The formula for polyamide b) comprises a range extending from homopolyamides to different copolyamides (binary, ternary and quaternary) which are suitable for the invention. Polyamide b) is selected preferably from the group comprising PA 12 and/or PA MACM 12. PA 12 is obtained from the formula for b) if x, y and u=zero and Z=12. PA MACM 12 is produced from the formula for b) if y, u and z=zero and X=DC12. The extended name for DC12 is dodecanedioic acid.

The weigh t proportion of copolyamide a) in the moulding compound is from 95 to 51% by weight (as already mentioned further back), preferably from 85 to 51%, particularly preferred from 80 to 51% by weight.

The weight proportion of polyamide b) in the moulding compound is 5 to 49% by weight, preferably from 10 to 49% by weight, particularly preferred from 15 to 49% by weight.

Advantageous properties of the polyamide moulding compound are produced in addition if the weight proportion of the at least one impact modifier c) is from 2 to 25% by weight, preferably from 3 to 20% by weight.

It is likewise advantageous if the weight proportion of the at least one additive d) is from 0 to 50% by weight, preferably 0 to 10% by weight. Preferred additives are thereby for example reinforcing fibres (e.g. glass fibres), regulators, catalysts, minerals, optical brighteners, stabilisers, lubricants, inclusion reducers, colour pigments, colourants, adhesives, carbon black and/or conductivity enhancers, this list being merely by way of example and not to be understood as being restrictive. There can be used as regulators in the polyamide production, for example benzoic acid, triacetonediamine and/or acetic acid. Catalysts are e.g. $H_3PO_2$ or $H_3PO_3$. There are possible as stabilisers, in particular heat- and/or UV stabilisers. These stabilisers are marketed for example with the trade names Irganox®, Hostanox®, Tinuvin® or Nylostab®. There can be used as optical brighteners e.g. brighteners such as Tinopal® DMSX or AMS-GX (Ciba) or Uvitex®& OB (Ciba).

By means of carbon black, blackening of the moulding compound, on the one hand, and also an increase in electrical conductivity can be achieved with a corresponding quantity at the same time. By means of the latter, for example electrostatic charges can be avoided.

The additives can be added both before or during the polymerisation process of the reaction mass and also be incorporated in the moulding compound subsequently, e.g. by extrusion (compounding). In particular by the addition of lubricants, a further increase in scratch resistance can thereby be achieved (in addition to increasing the flowability), which endows the moulding compound or the moulded articles produced therefrom with a further advantageous property in addition to high impact strength and high gloss.

The advantageous properties of the polyamide moulding compound according to the invention are shown in that the surface of a test plate has a gloss value, measured at an angle of 20° (according to ISO 2813) of at least 50%, preferably of at least 60%, particularly preferred of at least 70%. At the same time, the polyamide moulding compound thereby displays a high notch impact strength according to Charpy, this, measured on a corresponding test body at 23° C. (according to ISO 179/2-1 eA (Charpy)), being at least 15 $kJ/m^2$, preferably at least 16 $kJ/m^2$.

According to the invention, moulded articles made of the above-described polyamide moulding compound are likewise provided. These moulded articles are distinguished in particular in that the advantageous properties of the polyamide moulding compound are made use of: as a result of the high gloss value and the high notch impact strength, varnishing is consequently unnecessary. In particular, the moulded articles are selected from the group comprising visual parts and/or visible casings. The moulded articles can thereby be produced in any manner, e.g. by injection moulding or by injection-compression moulding, or by rear-spraying of foils made of moulding compounds according to the invention, or by extrusion, or by extrusion blow moulding. Further processing of the moulded articles is likewise possible, such as e.g. milling, boring, grinding, laser marking, laser welding or laser cutting. Colouration e.g. in dipping baths is likewise conceivable. There are possible as moulded articles likewise foils produced from the moulding compound, such as e.g. flat, blown, cast or multilayer foils, which can be subsequently processed for example via methods such as lamination, stretching, drawing and similar processes. Printing or colouration of the foil is likewise possible.

Purposes of use according to the invention of the moulding compound are for example possibilities of use for telephones, mobile telephones, MP3 players, coverings, casings, spectacle supports, spectacle frames, sunglasses, cameras, binoculars, GPS devices, decorative objects, protective films, items of furniture, automobile parts, sensor housings, measuring devices, music apparatus, TV sets, navigation apparatus, watches, game computers, game consoles, PCs, operating buttons, screens or operating panels, handles, containers, bottles, boxes, pipes or profiles, visible parts and/or visible casings, i.e. in principle moulded articles which are subject to permanent use and are thereby intended to maintain their protective function and high-quality appearance.

The present invention is clarified with reference to the subsequent compositions by way of example, and also with reference to comparative tests. It is evident from Table 1 that, with moulding compounds which are formed merely from one specific polyamide, simultaneous achievement of advantageous gloss values and advantageous notch impact strength is not possible (comparative examples 1 to 3). It is striking in particular that normal impact modifiers, such as Tafiner or Lotader, in a proportion of quantity of 10% by weight (which is usually used with the purpose of making it impact-resistant) greatly reduce the gloss value but, on the other hand, produce very high notch impact strengths (comparative examples 2 and 3). In further development, it was found astonishingly in the next tests that both the gloss and also the notch impact strength increase, starting from an impact-modified polyamide a), if a second polyamide b) is mixed into the moulding compound. This advance is evident if the comparative examples 4 or 6 are compared with comparative example 2 and analogously also between comparative example 5 and comparative example 3. Astonishingly, it was now able to be found in addition that moulding compounds with excellent gloss values and, at the same time, high notch impact strength can be obtained, i.e. the desired property profile was able to be optimised by a further adaptation such that the aim of the invention was achieved. This was achieved whilst retaining the second polyamide b), in that, in examples 1 and 2, in turn a selected different impact modifier in a proportion of quantity of 10% by weight was used, which modifier produced a lesser but nevertheless sufficient notch impact strength but impaired the gloss less than the other two impact modifiers. Hence a gloss level of approx. 70% was achieved. It was hereby totally surprising that especially a core-shell impact modifier of all things is optimal for this purpose. As explained already further back in the description, the leeway gained however by the second polyamide b) makes it possible to use other normal impact modifiers also according to the invention, i.e. fulfilling both requirements, in that the proportion of quantity is adjusted to be less.

In Table 2, the composition for the Grilamid® TR 60 which was mentioned in Table 1 and used for the tests as polyamide a) is indicated.

The diamine MACM is thereby divided into the two dicarboxylic acids I and T (23% by weight for I and 22% by weight for T) so that, if it is expressed as in claim 8, the MACMI proportion is 39% by weight and the MACMT proportion is 37% by weight. In addition, the LC12 proportion in this copolyamide is 24% by weight, with which the sum of the proportions produces 100% by weight.

Tafmer MC-201 (by the company Mitsui) is an impact modifier mixture comprising ethylene-propylene- and ethylene-butylene copolymers grafted with maleic anhydride.

Lotader GMA AX8840 is an impact modifier comprising polyethylene copolymer with 8% by weight glycidylmethacrylate by the company Arkema (FR).

Paraloid BTA 753 is a core-shell impact modifier based on methacrylates, butadiene and styrene (MBS copolymer) by the company Rohm and Haas.

Carbon black was introduced in the form of a master batch (concentrate) produced by the company EMS-CHEMIE AG (as indicated in Table 1) in order to colour the moulding compound black so that the pure surface gloss could subsequently be measured without an effect caused by reflection of deeper material layers or of the opposite surface of the 2 mm thick test plate.

TABLE 1

| Formulations (Proportions in % by wt) | | | | Comparative example 1 | Comparative example 2 | Comparative example 3 | Comparative example 4 | Comparative example 5 | Comparative example 6 | Example 1 | Example 2 |
|---|---|---|---|---|---|---|---|---|---|---|---|
| GRILAMID TR60 nat. (polyamide a)) | | | | 99 | 89 | 89 | 69 | 69 | 69 | 69 | 69 |
| MB L20 black (PA 12 with 25% by wt carbon black | | | | 1 | 1 | 1 | 1 | 1 | 1 | 1 | 1 |
| TAFMER MC201 impact modifier c)) | | | | | 10 | | 10 | | 10 | | |
| LOTADER GMA AX8840 (impact modifier c)) | | | | | | 10 | | 10 | | | |
| PARALOID BTA753 (impact modifier c)) | | | | | | | | | | 10 | 10 |
| GRILAMID TR90 nat. (PA MACM 12) (polyamide b)) | | | | | | | 20 | 20 | | 20 | |
| GRILAMID L20 nat. (PA 12) (polyamide b)) | | | | | | | | | 20 | | 20 |
| Test plate 2 mm thick, surface | Condition | State | Unit | | | | | | | | |
| Gloss value | 20° | dry | % | 93 | 4 | 6 | 8 | 26 | 40 | 69 | 76 |
| Basic data (thermal) | | | | | | | | | | | |
| Tg | — | dry | °C. | 190 | 190 | 189 | 181 | 179 | 163 | 178 | 163 |
| Melting point | — | dry | °C. | — | — | 101 | — | 101 | 175 | — | 174 |
| Melting enthalpy | — | dry | J/g | — | — | 4.0 | — | 5.8 | 5.2 | — | 8.1 |
| Mechanics | | | | | | | | | | | |
| Tensile modulus | — | dry | MPa | 2245 | 1770 | 1815 | 1660 | 1690 | 1710 | 1735 | 1765 |
| Notch impact strength Charpy | 23° C. | dry | KJ/m² | 7.1 | 41.8 | 35.2 | 48.2 | 37.2 | 53.8 | 16.6 | 18.2 |
| Hardness on DIN-tensile test bar 4 mm thick (measured on the flat shoulder end) | | | | | | | | | | | |
| Ball impression hardness | — | dry | MPa | 146 | 110 | 113 | 105 | 108 | 103 | 112 | 109 |

TABLE 2

| Polyamide Type Grilamid ® | | TR 60 |
|---|---|---|
| MACM | % by wt | 45 |
| I | % by wt | 16 |
| T | % by wt | 15 |
| LC12 | % by wt | 24 |
| Sum | % by wt | 100 |

The invention claimed is:

1. Polyamide moulding compound comprising
   a) 85 to 51% by weight of an amorphous copolyamide of the formula

PA MACMI/MACMT/12 with a MACMI proportion in the copolyamide in the range of 5 to 95% by weight, MACMT proportion in the range of 0 to 90% by weight and LC12 proportion in the range of 5 to 60% by weight, the sum of these three proportions in copolyamide a) being 100% by weight,
   b) 10 to 49% by weight of an amorphous or microcrystalline or partially crystalline polyamide of the formula PA(MACMX)x/(PACMY)y/(mXDU)u/(LCZ)z the proportions x, y, u and z of the four monomer groups being respectively between 0 and 100% by weight, the sum of these four proportions in polyamide b) being 100% by weight; X, Y and U meaning dicarboxylic acids selected from the group consisting of DC4, DC6, DC9, DC10, DC11, DC12, DC13, DC14, DC15 to DC36, and LCZ lactams, or corresponding amino carboxylic acids selected from the group consisting of LC4, LC6, LC11 and LC12,
   c) 1 to 30% by weight at least of one core-shell impact modifier, and also
   d) 0 to 80% by weight at least of one additive selected from the group consisting of reinforcing fibers, regulators, catalysts, minerals, optical brighteners, stabilizers, lubricants, inclusion reducers, color pigments., colorants, adhesives, carbon black and conductivity enhancers or a mixture thereof,
   the sum of components a), b), c) and d) being 100% by weight.

2. Polyamide moulding compound according to claim 1, wherein in the case of copolyamide a), the proportion of the quantity of lactam is between 10 to 50% by weight.

3. Polyamide moulding compound according to claim 1, wherein copolyamide a) is a PA MACMI/12 and has a MACMI proportion in the copolyamide in the range of 60 to 70% by weight and an LC12 proportion in the range of 30 to 40% by weight.

4. Polyamide moulding compound according to claim 1, wherein copolyamide a) is a PA MACMI/12 and has a MACMI proportion in the copolyamide in the range of 75 to 85% by weight and an LC12 component in the range of 15 to 25% by weight.

5. Polyamide moulding compound according to claim 1, wherein copolyamide a) has
   a MACMI proportion in the copolyamide in the range of 30 to 45% by weight,
   a MACMT proportion in the range of 30 to 45% by weight and
   an LC12 proportion in the range of 40 to 10% by weight, these three proportions in the copolyamide together being 100% by weight.

6. Polyamide moulding compound according to claim 1, wherein the second polyamide b) is selected from the group comprising PA 12 and/or PA MACM 12.

7. Polyamide moulding compound according to claim 1, wherein the at least one core-shell impact modifier c) is selected from the group consisting of ethylene-α-olefin copolymers and the ethylene-glycidylmethacrylic acid polymers.

8. Polyamide moulding compound according to claim 7, wherein the impact modifier c) is a methacrylate-butadiene-styrene (MBS) core-shell impact modifier.

9. Polyamide moulding compound according to claim 1, wherein the weight proportion of the at least one impact modifier c) is from 2 to 25% by weight.

10. Polyamide moulding compound according to claim 1, wherein the weight proportion of the at least one additive d) is from 0 to 50% by weight.

11. Polyamide moulding compound according to claim 1, wherein the surface of a test plate has a gloss value, measured at an angle of 20° (according to ISO 2813), of at least 50%.

12. Polyamide moulding compound according to claim 1, wherein the notch impact strength (notched impact Charpy) of a test body, measured at 23° C. (according to ISO 179/2-1 eA (Charpy)), is at least 15 kJ/m$^2$.

13. Moulded article producible from a polyamide moulding compound according to claim 1.

14. Moulded article according to claim 13, wherein the mould article is unvarnished.

15. Moulded article according to claim 13, selected from the group consisting of visible parts and visible casings.

16. Polyamide moulding compound according to claim 1, wherein the amorphous copolyamide a) is contained in a proportion of 85 to 51% by weight.

17. Polyamide moulding compound according to claim 1, wherein polyamide b) is contained in a proportion of 15 to 49% by weight.

18. Polyamide moulding compound according to claim 1, where in the case of copolyamide a), the proportion of the quantity of lactam is between 15 to 45% by weight.

19. Polyamide moulding compound according to claim 1, wherein the weight proportion of the at least one impact modifier c) is from 3 to 20% by weight.

20. Polyamide moulding compound according to claim 1, wherein the weight proportion of the at least one additive d) is from 0 to 10% by weight.

21. Polyamide moulding compound according to claim 1, wherein the surface of a test plate has a gloss value, measured at an angle of 20° (according to ISO 2813), of at least 60%.

22. Polyamide moulding compound according to claim 1, wherein the surface of a test plate has a gloss value, measured at an angle of 20° (according to ISO 2813), of at least 70%.

23. Polyamide moulding compound according to claim 1, wherein the notch impact strength (notched impact Charpy) of a test body, measured at 23° C. (according to ISO 179/2-1 eA (Charpy)), is at least 16 kJ/m$^2$.

* * * * *